United States Patent [19]
Soloff

[11] Patent Number: 5,369,447
[45] Date of Patent: Nov. 29, 1994

[54] VIDEO IMAGE FILTERING

[75] Inventor: Jonathan M. Soloff, Basingstoke, United Kingdom

[73] Assignee: Sony United Kingdom Ltd., Staines, United Kingdom

[21] Appl. No.: 957,094

[22] Filed: Oct. 7, 1992

[30] Foreign Application Priority Data

Nov. 15, 1991 [GB] United Kingdom ............ 9124343.6

[51] Int. Cl.⁵ .................................................. H04N 3/223
[52] U.S. Cl. ......................................... 348/627; 348/441; 345/132
[58] Field of Search ............... 358/142, 180, 167, 160, 358/140, 166; 340/728, 736; 348/441, 627, 173; 345/13, 132; H04N 3/223

[56] References Cited

U.S. PATENT DOCUMENTS

| | | | |
|---|---|---|---|
| 4,439,762 | 3/1984 | Van Vliet et al. | 340/728 |
| 4,847,676 | 7/1989 | Oliphant | 358/180 |
| 4,862,271 | 8/1989 | Smith et al. | 358/166 |
| 4,958,229 | 9/1990 | Guillon et al. | 358/160 |
| 5,068,728 | 11/1991 | Macouski | 358/142 |
| 5,087,971 | 2/1992 | Sakata et al. | 358/160 |
| 5,119,082 | 6/1992 | Lumelsky et al. | 345/132 |
| 5,208,668 | 5/1993 | Dinsel et al. | 358/11 |
| 5,208,669 | 5/1993 | Richards | 358/160 |
| 5,223,936 | 6/1993 | Van der Voort et al. | 348/173 |

Primary Examiner—Mark R. Powell
Assistant Examiner—Jeffrey S. Murrell
Attorney, Agent, or Firm—William S. Frommer; Alvin Sinderbrand

[57] ABSTRACT

A video image filtering system is described which utilises multi-tap filters (70). In order to reduce the effects of edge distortion due to the finite size of the input image, extension data is added both the beginning and end of each raster line of data fed to the multi-tap filter (70). The function of the extension data is to pre-load the multi-tap filter (70). With a system constrained to operate at a constant sample rate, there is insufficient inter-raster line separation to accommodate the extension data needed for a long multi-tap filter (70). The system transforms the input video signal format (24) to a reformatted video signal format (28, 30) in which either the horizontal blanking or vertical blanking period has been maximised at the expense of the corresponding other blanking period. Having been reformatted, the raster lines are fed to a line store 60 from where sample values are read and output to the multi-tap filter 70 in the appropriate order to prefix or suffix the extension data to the original active video data.

15 Claims, 6 Drawing Sheets

| EXTENSION | ACTIVE DATA | EXTENSION |

| 1, 1, | 1,2,3,.... ....,766,767,768, | 768, 768. |

END EXTENSION

| 767, 768, | 1,2,3,.... ....,766,767,768, | 1, 2 |

CIRCULAR EXTENSION

| 3, 2, | 1,2,3,.... ....,766,767,768, | 767, 766 |

SYMMETRIC EXTENSION

VIDEO IMAGE FILTERING

BACKGROUND OF THE INVENTION

1. Field of the Invention

This invention relates to the field of video image filtering. More particularly, this invention relates to the field of video image filtering using multi-tap filters, such as finite impulse response filters.

2. Description of the Prior Art

It is known to carry out video image filtering using multi-tap filters for a variety of purposes, e.g. to remove undesirable artifacts from an image or as part of a data compression system using sub band filtering. Filtering video image data with multi-tap filters is subject to problems resulting from the finite extent of the image being filtered. FIG. 1 of the accompanying drawings illustrates this problem.

Blocks of sample data 2, 4 corresponding to respective vertical and horizontal rasters through the image are fed to corresponding finite impulse response filters 6, 8. The finite impulse response filters 6, 8 have five taps. The filtered data value corresponding to a given sample point within the input data is generated by the adders 10, 12 when that given input sample value is at the centre tap of the filter.

In the example illustrated, the first sample value of each of the rasters is at the centre tap. Whilst the upstream taps of the filter are loaded with valid data, the downstream taps carry invalid data read from the blanking period of the input video signal. The consequence of this is that until the filter is fully loaded with valid data, the filtered data values produced by the adders 10, 12 are distorted. When the filtered data values generated in this way are subsequently used to produce an image 14 for display, the result of this distortion is visible around the edges of the produced image.

In order to counter this problem it has been proposed that the rasters/blocks of input video data should be extended prior to being fed into the multi-tap filters. FIG. 2 of the accompanying drawings illustrates a number of different extension strategies that may be used.

End extension repeats the first and last values at either end of the active data. Circular extension prefixes the active data with the sequence of samples from the end of the active data and suffixes the active data with the sequence of samples from the beginning of the active data. Circular extension is intended to give a form of limited periodicity to the data. Symmetric extension adds a mirror image copy of the first part of the active data to the beginning of the active data and a mirror image copy of the last part of the active data to the end of the active data.

Whilst the above has been described in terms of rasters/blocks of raw image data, it will be appreciated that video image filtering is often a multi-stage process and that the data that is input to a multi-tap filter may already have undergone processing which alters the nature of what the active data within that raster/block actually represents. An example of this is shown in FIG. 3 of the accompanying drawings. FIG. 3 shows a raster of data which has already undergone spatial frequency sub-band filtering. The low frequency components of the original data are collected together in a block at the beginning of the raster and the high frequency components of the original data are collected together in a block at the end of the raster.

The low frequency components and high frequency components 16 are the active data within the raster and are separated by blanking periods. Into these blanking periods extension data 18, 20 is added. The extension data 18 is derived from the low frequency component active data and the extension data 20 is derived from the high frequency component active data. Each section of valid active data is thus extended so that distortion upon subsequent filtering with a multi-tap filter is reduced.

It will be appreciated that the sub band filtering transforms the raw image into the spatial frequency domain, but reducing distortion in this transformed image per se is not the main priority. The transformation is carried out as part of a data compression technique. When the data is decompressed and transformed back into the spatial domain, the most important factor is the degree of distortion in the reconstructed image. In most cases a reduction of distortion in the transformed image will result in a reduction of distortion in the reconstructed image, but it is important to keep in mind the priorities of the complete system.

FIG. 4 of the accompanying drawing illustrates how the use of the technique of extending the data results in a reduction in distortion at the edges. The system illustrated in FIG. 4 is essentially the same as that illustrated in FIG. 1 with the addition of the data extension units 20, 22. The data extension units 20, 22 carry out the extension of the rasters of data as illustrated in FIGS. 2 and 3. In the case illustrated, symmetric extension is employed. By extending the raster line of data, the filters 6, 8 are effectively fully preloaded with valid data by the time the first true sample (sample 1) arrives at the centre tap. In this way, the edge distortion is pushed away from data that will be used in the subsequently displayed image 14.

The edge distortion still occurs at the edges of the extended rasters of data, but is confined within the extended portion. Since this extended portion does not in fact represent true data and will subsequently be discarded prior to display, the effect of edge distortion within the valid data is reduced.

From the foregoing it will be seen that the technique of edge extension is highly effective in reducing edge distortion. If one is carrying out image filtering on a non-real time basis (e.g. still image processing in a computer system), then the additional overhead of the step of extending the rasters of data slightly increases the time taken to process the image. The implementation of the edge extension technique in a real time video system is not straightforward.

In any video image processing system it is desirable for the purposes of reducing cost and complexity to have a single clock/data sample rate throughout the system. Running any part of the system at a higher rate introduces problems of maintaining synchronisation and also involves the use of more expensive higher speed components.

Whilst the filters 6, 8 of FIGS. 1 and 4 have been shown with only 5 taps, a production filter would have far more taps, e.g. a 32 tap filter would not be unusual. With these much longer filters, longer extension blocks must be added to the rasters of data in order to effectively pre-load the filter prior to the first valid sample arriving at the centre of the filter. Thus the problem arises of adding long extension blocks with hardware that is only running at the base data sample rate.

SUMMARY OF THE INVENTION

Viewed from one aspect the invention provides a video image filtering apparatus for filtering an input video signal, the input video signal having a predetermined sample rate and representing a sequence of sets of raster lines, each raster line having a period of active video data and a predetermined inter-raster blanking period, and each set of raster lines being separated by a predetermined inter-set blanking period, the video image filtering apparatus comprising:

(i) an image store for receiving and storing the input video signal;

(ii) means for reading the image store to generate a reformatted video signal having the predetermined sample rate but representing a sequence of sets of raster lines with a different inter-raster blanking period and a different inter-set blanking period;

(iii) means for extending the active video data of the raster lines of the reformatted video signal; and (iv) one or more multi-tap filters for filtering the reformatted video signal with extended active video data.

The invention both recognises and solves the problem that with a fixed data sample rate and signal format, there may not be sufficient gaps between the raster lines of active data to accommodate the lengthy extension blocks that should be added.

In the case of an NTSC standard input video signal, the input video signal can be considered to be composed of a sequence of interlaced fields, each field being composed of a set of 242 active raster lines separated by a inter-set/vertical blanking period corresponding to 20 raster lines. The horizontal raster lines have a total duration corresponding to 910 data samples. Of the total horizontal raster line period 768 sample periods are filled with active video data and 142 sample periods are taken up with the inter-raster/horizontal blanking period.

If such a format or signal is to be subject to sub band filtering in both the horizontal and vertical directions with 32 tap filters then extension blocks of a length of 16 data samples must be added to either end of a horizontal or vertical raster through the image data. In the case of the horizontal filtering, there are 142 spare sample periods for each horizontal raster line giving plenty of capacity for the extension blocks to be added. In contrast, if the image data is scanned vertically at the data sample rate then there are only 20 spare sample periods between rasters and this is insufficient to add in the required length of extension blocks. The invention overcomes this problem by reformatting the video signal to reallocate time corresponding to horizontal blanking into the vertical blanking when the image is to be rastered vertically. In such circumstances the horizontal blanking period is not needed since the extensions are being added vertically and the reallocation of horizontal blanking time to the vertical blanking allows sufficient time for the necessary extension blocks to be added and processed.

Similarly, whilst in the case of a 32 tap filter the standard format provides sufficient time fop the horizontal extension blocks to be added unprocessed, this might not be the case if longer filters requiring longer extension blocks were used. In this case, the reallocation of some of the vertical blanking period to extend the horizontal blanking period would assist in providing the necessary capacity to carry out the extension technique.

It will be appreciated that the invention is applicable to input video signals which could be either vertically or horizontally rastered. However, the common video signal formats such as NTSC, PAL and SECAM are horizontally rastered and accordingly the predetermined inter-raster blanking period is a horizontal blanking period and the predetermined inter-set blanking period is a vertical blanking period.

As explained above, in most cases there is less excess capacity in the vertical direction than in the horizontal direction and accordingly in preferred embodiments of the invention the reformatted video signal is a vertically rastered video signal with a vertical blanking period greater than that of the input video signal and a horizontal blanking period smaller than that of the input video signal.

There exist a number of different possible forms of extension data that can be added. However, it has been found particularly advantageous to provide embodiments of the invention in which the means for extending adds a mirror symmetric copy of part of the active video data to each end of the active video data. This form of extension data has been found to produce advantageously low levels of edge distortion in the reconstructed image produced with sub band filtering data compression systems.

It will be appreciated that there are many different types of multi-tap filters, e.g. infinite impulse response filters and finite impulse response filters. The invention has been found particularly useful in conjunction with finite impulse response filters. in particular, the use of mirror symmetric extension data with finite impulse response filters of the so called "perfect reconstruction" type as being found to practically eliminate edge distortion in the valid data. The term "perfect reconstruction" will be understood as having the meaning usual in the art and not that of a theoretically perfect reconstruction.

The video image filtering apparatus of the invention could be carrying out a number of different tasks e.g. the removal of unwanted artifacts from the image. One possible form of video image filtering apparatus in which the invention has been found to be particularly useful is that in which the one or more finite impulse response filters are configured to carry out sub-band filtering.

In the case of a data compression system the combination of sub band filtering, finite impulse response "perfect reconstruction" type filters and symmetric edge extension has been found to produce an overall system in which edge distortion in the reconstructed image (i.e. the main priority) can be reduced to very low levels or effectively eliminated. This combination is strongly advantageous.

An advantageously simple and inexpensive embodiment of the invention is one in which the means for reading the image store includes an image counter for generating an image count value and an image address map store for mapping the image count value to an address value within the image store holding the next data value to be added to the reformatted video signal.

In order to reduce the capacity needed for the image store, the image store holds only active video data from the input video signal and the means for reading the image store includes a blanking value generator responsive to the address values for inserting blanking data into the reformatted video data at times corresponding to the inter-raster blanking period and the inter-set blanking period.

A complementary aspect of the present invention is the provision of a video image filtering apparatus comprising:

(i) a line store for receiving and storing data representing a raster line of an input video signal;

(ii) means for reading the line store in an order that generates an extended raster line formed of the data of the raster line of the input video signal extended with data derived from the raster line of the input video signal; and (iii) a multi-tap filter for filtering the extended raster line.

This complementary aspect of the invention provides for the addition of the extension data whilst maintaining the same sample rate and exploiting the inter-raster line delays that have been provided by the reformatting of the data.

A particularly simple and inexpensive embodiment of this aspect of the invention is one in which the means for reading the line store includes a line counter for generating a line count value and a line address map store for mapping the line count value to an address value within the line store holding the next data value to be added to the extended raster line.

Preferred embodiments of this aspect of the invention are ones in which the means for reading the line store adds a mirror symmetric copy of part of the raster line of the input video signal to each end of the raster line of the input video signal to generate the extended raster line.

The requirements for real time processing are eased by the provision of two line stopes with corresponding means for reading connected to form a swing buffer arrangement, each line store receiving and extending alternate raster lines of the input video signal and passing the extended raster lines to the multi-tap filter.

Viewed from another aspect the invention provides a video image filtering method for filtering an input video signal, the input video signal having a predetermined sample rate and representing a sequence of sets of raster lines, each raster line having a period of active video data and a predetermined inter-raster blanking period, and each set of raster lines being separated by a predetermined inter-set blanking period, the video image filtering method comprising the steps of:

(i) receiving and storing the input video signal into an image store;

(ii) reading the image store to generate a reformatted video signal having the predetermined sample rate but representing a sequence of sets of raster lines with a different inter-raster blanking period and a different inter-set blanking period;

(iii) extending the active video data of the raster lines of the reformatted video signal; and (iv) filtering the reformatted video signal with extended active video data using one or more multi-tap filters.

Viewed from a further aspect the invention provides a video image filtering method comprising the steps of:

(i) receiving and storing data representing a raster line of an input video signal in a line store;

(ii) reading the line store in an order that generates an extended raster line formed of the data of the raster line of the input video signal extended with data derived from the raster line of the input video signal; and (iii) filtering the extended raster line with a multi-tap filter.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 5:
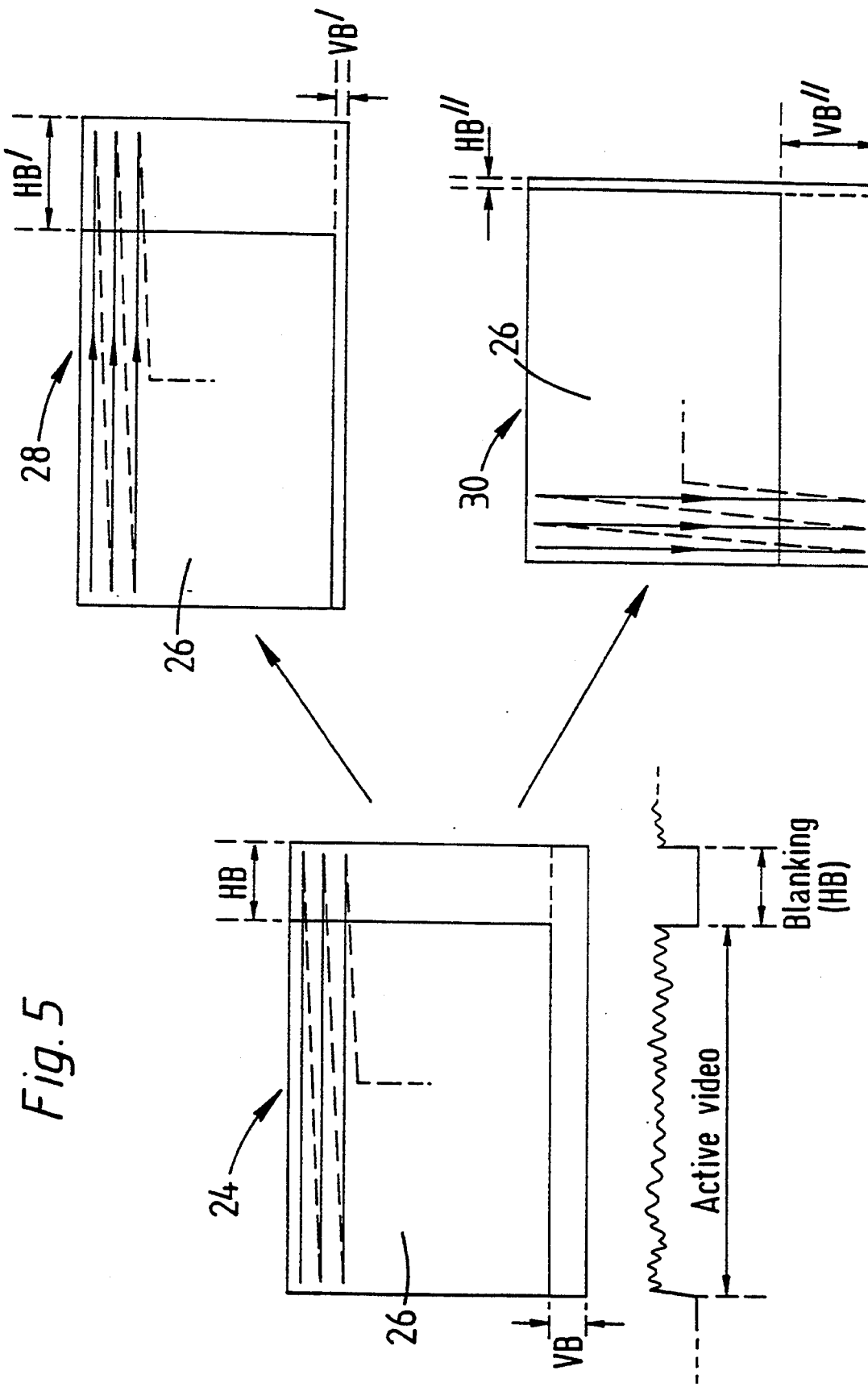
FIG. 5 illustrates the reformatting of a video signal to increase the inter-raster blanking period to accommodate extension data.

FIG. 5 shows the input video data signal format 24. This input format has a horizontal blanking period HB and a vertical blanking period VB. The active video data is contained within portion 26. The input format is one in which the signal is horizontally rastered.

The reformatted video signal 28 is one in which spare vertical blanking capacity has been reallocated to extend the horizontal blanking period. The increased horizontal blanking period is shown as HB' and the correspondingly decreased vertical blanking period is shown as VB'. The active video data portion 26 is identical to that in the input format. The reformatted video signal 28 is horizontally rastered and fed to a horizontal multi-tap filter.

Another reformatted signal format 30 is also illustrated. In this format the excess horizontal blanking capacity has been used to increase the vertical blanking period. The increased vertical blanking period is shown as VB" and the correspondingly decreased horizontal blanking period is shown as HB". The active video data portion 26 is unaltered other than for the fact that it is now vertically rather than horizontally rastered.

Figure 6:
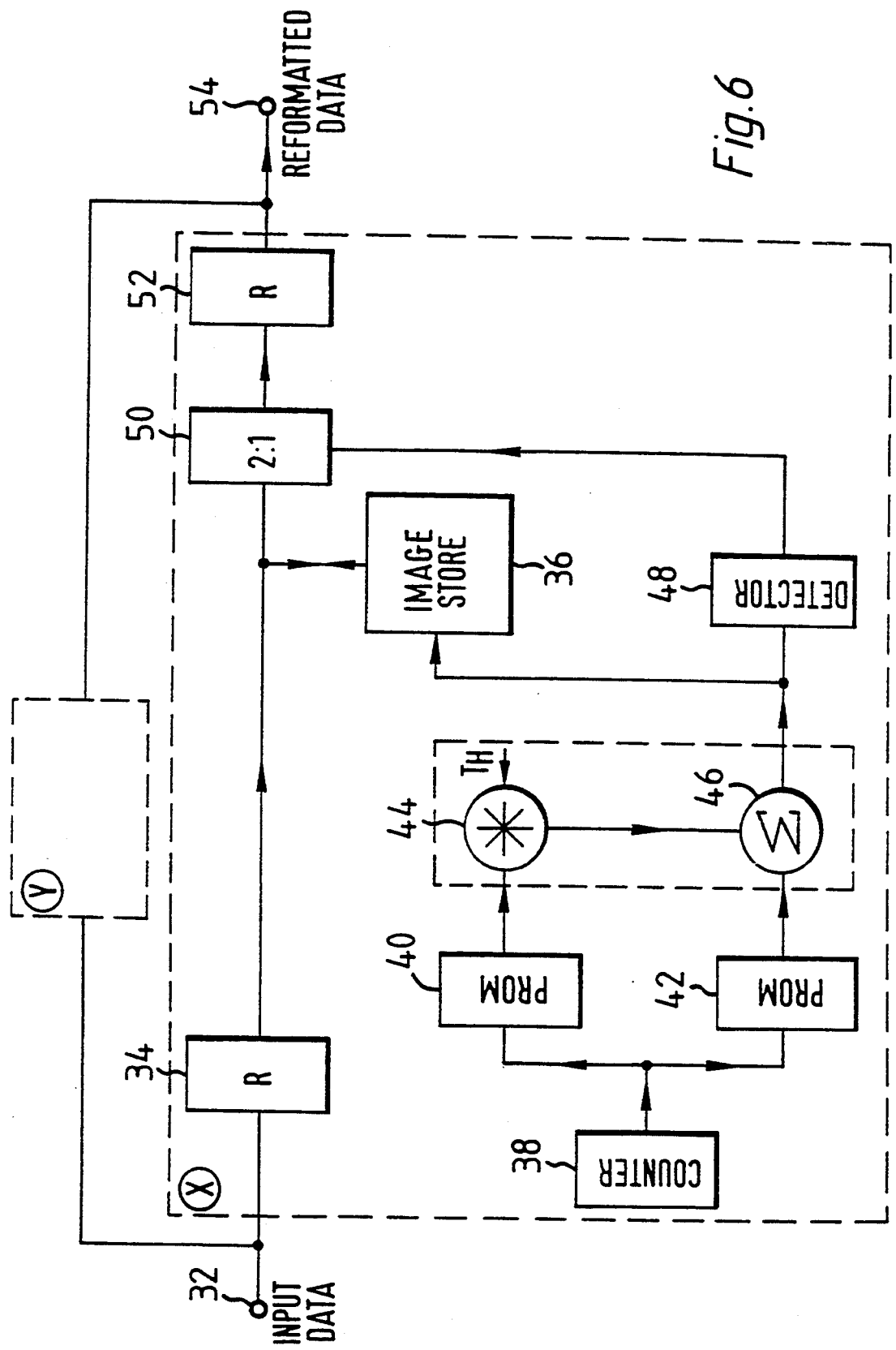
FIG. 6 schematically illustrates a circuit For carrying out the reformatting illustrated in FIG. 5.

FIG. 6 shows a circuit for carrying out the reformatting illustrated in FIG. 5. The circuit is composed of two parts X, Y connected in a swing buffer type arrangement. Each parts is the same and only one will be described in detail. The two parts operate so that whilst one part is reading in a field of data the other is outputting the reformatted data from the previous field. The parts then swap function.

The input video signal is applied to input node 32 from where it is passes via a register 34 to an image store 36. Only the active video data portion 26 is stored in the image store 36.

When a full field has been captured in the image store 36, the counter 38 and PROMs 40, 42 acting in conjunction with the multiplier 44 and adder 46 serve to generate a sequence of image store addresses. These image store addresses are passed to the image store 36 where they access a particular sample from the stored active video data. If the image store address is one which corresponds to a position outside of the active video data then this is sensed by detector 46 which then generates a null data value for insertion in the output reformatted data stream. A multiplexer 50 selects between the appropriately addressed sample values from the image store 36 and the null values generated by the detector 48. The output from the multiplexer then passes via a register 52 to an output node 54.

The PROMs 40, 42 serve as an address map store. The input count value from the counter 38 accesses a given address within the PROM which maps the count value to an appropriate horizontal and vertical coordinate value within the reformatted data. The vertical coordinate value is multiplied by a scaling factor $T_H$ (horizontal raster length) by the multiplier 44 and then added to the horizontal coordinate by the adder 46.

Figure 7:
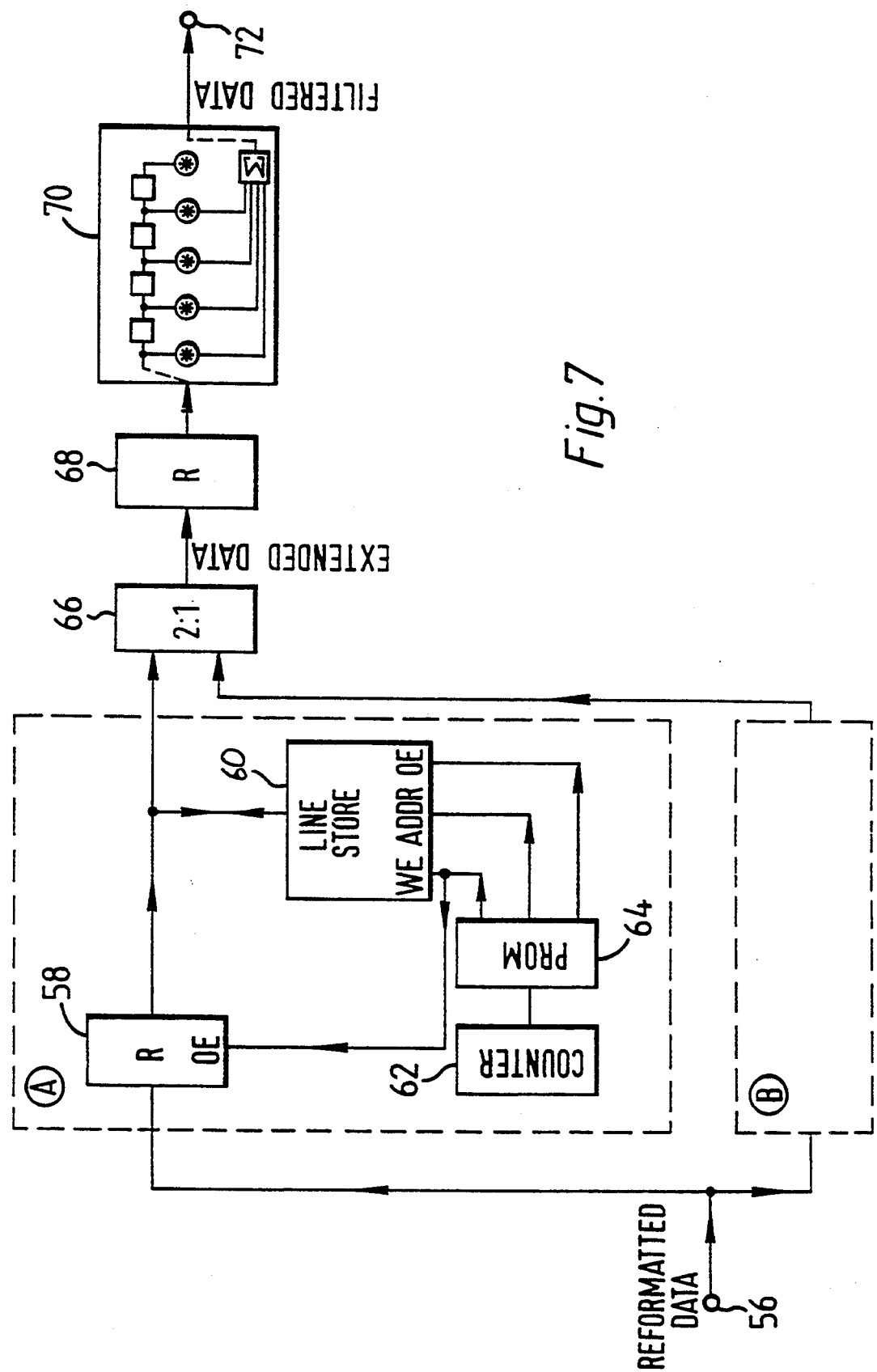
FIG. 7 schematically illustrates a circuit for adding the extension data to the reformatted data produced by the circuit of FIG. 6.

FIG. 7 illustrates a circuit for adding the extension data to the active video data. The reformatted data from the circuit of FIG. 6 is input at an input node 56. The reformatted data has sufficiently long inter-raster line blanking periods to allow the circuit of FIG. 7 to carry out the addition of the extension data. The circuit of FIG. 7 has two line stores and associated circuitry in a swing buffer type arrangement. The two sides of this swing buffer are denoted by block A and block B. Block A and block B are identical. Only block A is illustrated in detail.

The reformatted data passes through a register 58 to a line store 60 during the write cycle of that half of the swing buffer. Once the full raster line has been stored, the swing buffer switches to write the next raster line into the block B. Whilst block B is receiving the next raster line, block A outputs data from the line store 60.

Figure 1:
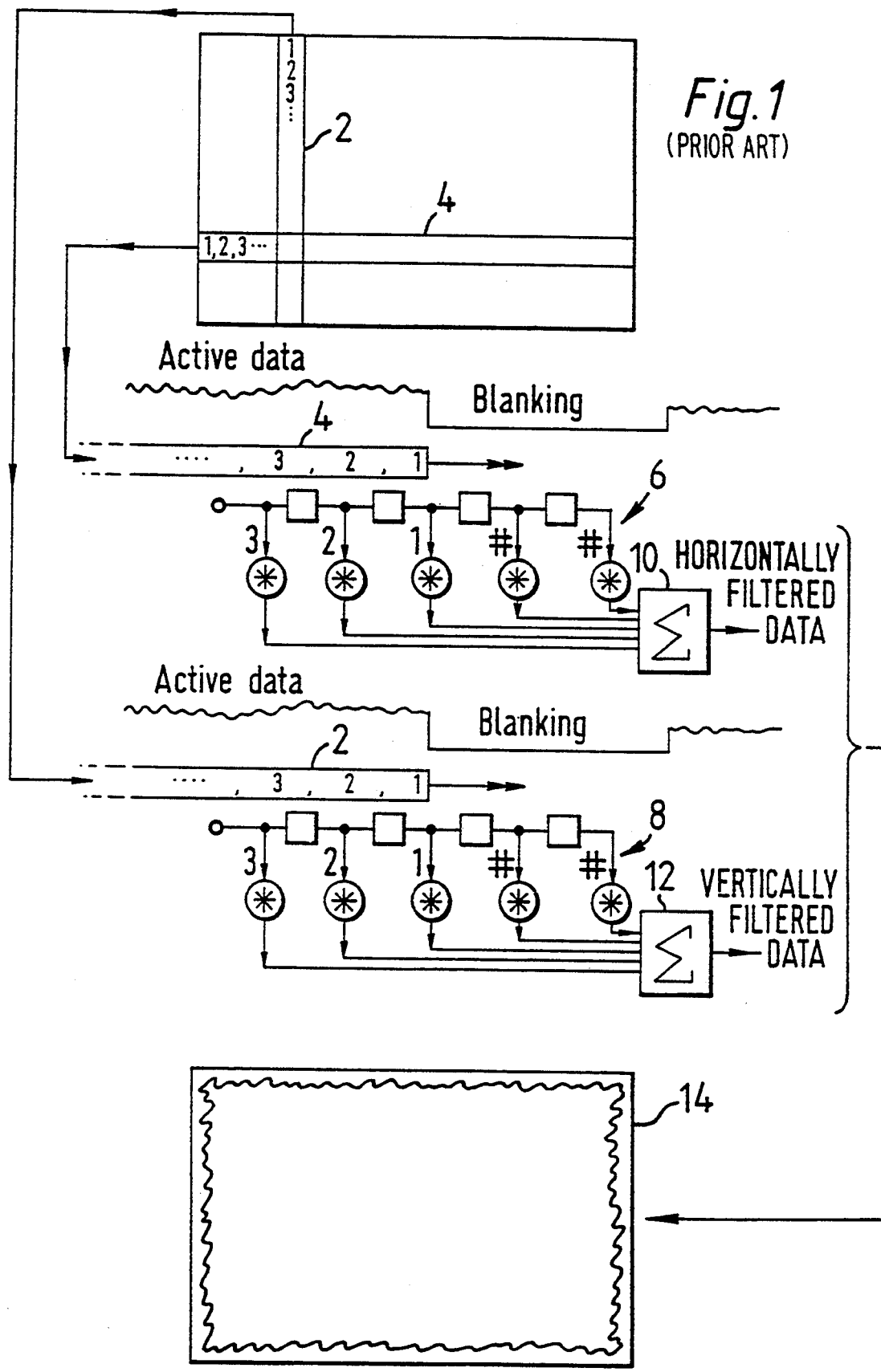
FIG. 1 schematically illustrates an image filtering apparatus using multi-tap filters suffering from the problem of edge distortion.
Figures 2, 3:
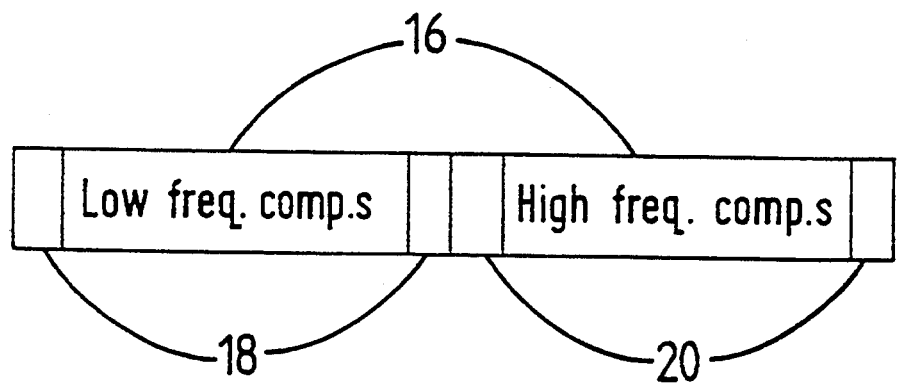
FIGS. 2 and 3 illustrate the addition of extension data to rasters/blocks of active video data.
Figure 4:
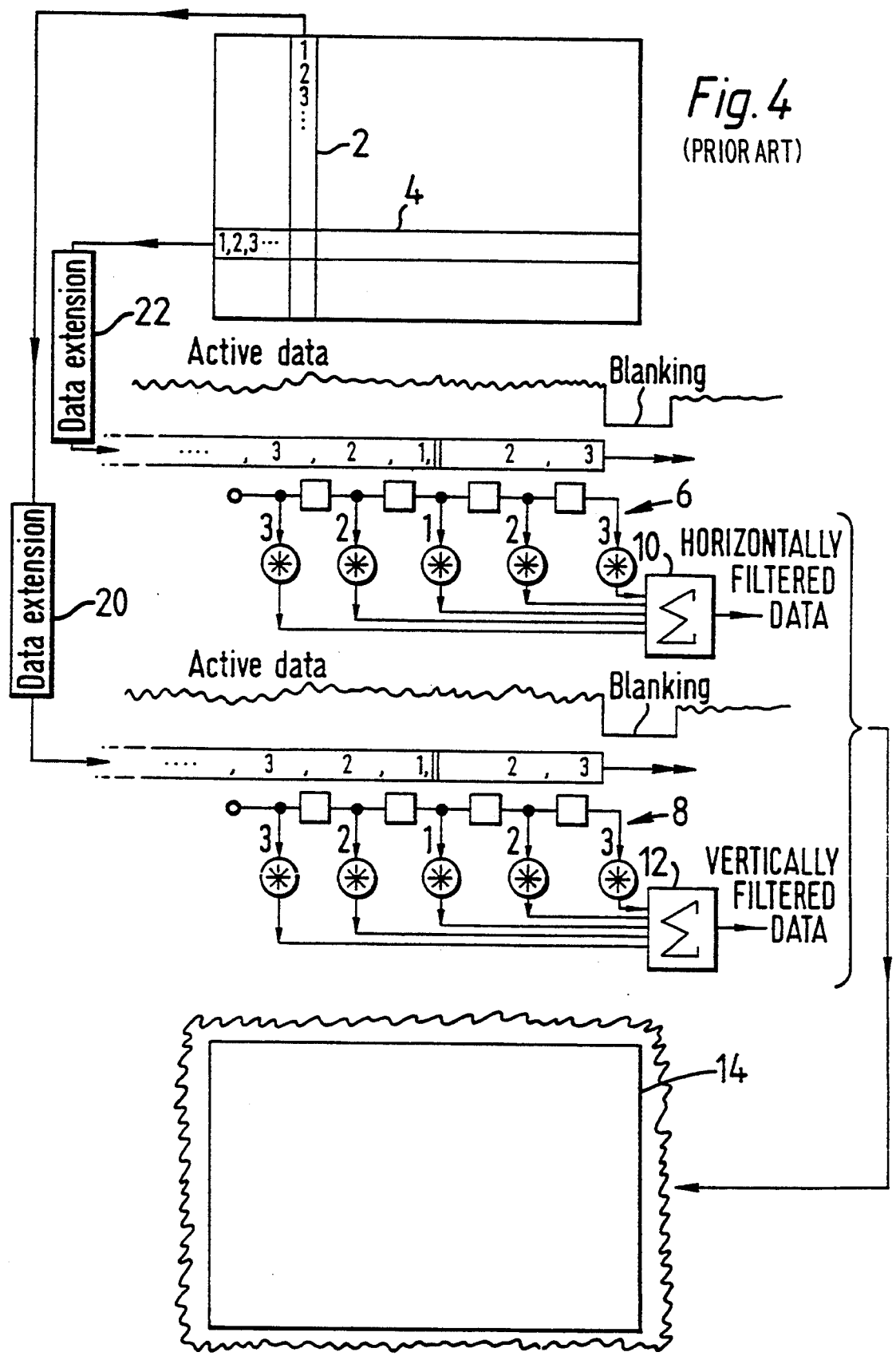
FIG. 4 schematically illustrates an image filtering apparatus using multi-tap filters and extension data to reduce the problem of edge distortion.

A counter 62 generates an incrementing count value which is mapped by a PROM 64 into a sequence of addresses within the line store 60. This sequence of addresses is chosen to follow the appropriate sample value sequence of the extended active data portion. Thus, in the case of the symmetric extension illustrated in FIG. 2 the sequence of addresses would cause the samples 3, 2, 1, 2, 3 . . . , 766, 767, 768, 767, 766 to be output from the line store 60.

A multiplexer 66 selects the appropriate output from block A and block B and passes this via a register 68 to a multi-tap filter 70. The multi-tap filter 70 carries out the appropriate horizontal or vertical spatial frequency separation to generate a stream of filtered data at output node 72. The multi-tap filter 70 is of the "perfect reconstruction" type.

The combination of the symmetric edge extension and the "perfect reconstruction" type filter in a system for transforming into the two-dimensional spatial frequency domain produces a transformed image that when reconstructed with the complementary filters is effectively free from any edge distortion.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A video image filtering apparatus for filtering an input video signal, the input video signal having a predetermined sample rate and representing a sequence of sets of raster lines, each raster line having a period of active video data and a predetermined inter-raster blanking period, and each set of raster lines being separated by a predetermined inter-set blanking period, the video image filtering apparatus comprising:

an image store for receiving and storing the input video signal;

means for reading the image store to generate a reformatted video signal having the predetermined sample rate but representing a sequence of sets of raster lines with a different inter-raster blanking period and a different inter-set blanking period;

means for extending the active video data of the raster lines of the reformatted video signal; and at least one multi-tap filter for filtering the reformatted video signal with extended active video data.

2. A video image filtering apparatus as claimed in claim 1, wherein the predetermined inter-raster blanking period is a horizontal blanking period and the predetermined inter-set blanking period is a vertical blanking period.

3. A video image filtering apparatus as claimed in claim 1, wherein the reformatted video signal is a vertically rastered video signal with a vertical blanking period greater than that of the input video signal and a horizontal blanking period smaller than that of the input video signal.

4. A video image filtering apparatus as claimed in claim 1, wherein the one or more multi-tap filters are finite impulse response filters.

5. A video image filtering apparatus as claimed in claim 4, wherein the one of more finite impulse response filters are configured to carry out sub-band filtering.

6. A video image filtering apparatus for filtering an input video signal, the input video signal having a predetermined sample rate and representing a sequence of sets of raster lines, each raster line having a period of active video data and a predetermined inter-raster blanking period, and each set of raster lines being separated by a predetermined inter-set blanking period, the video image filtering apparatus comprising:

an image store for receiving and storing the input video signal;

means for reading the image store to generate a reformatted video signal having the predetermined sample rate but representing a sequence of sets of raster lines with a different inter-raster blanking period and a different inter-set blanking period;

means for adding a mirror symmetric copy of part of the active video data of the raster lines of the reformatted video signal to each end of the active video data to extend the active video data of the reformatted video signal; and at least one multi-tap filter for filtering the reformatted video signal with extended active video data.

7. A video image filtering apparatus as claimed in claim 6, wherein the one or more multi-tap filters are finite impulse response filters of the perfect reconstruction type.

8. A video image filtering apparatus for filtering an input video signal, the input video signal having a predetermined sample rate and representing a sequence of sets of raster lines, each raster line having a period of active video data and a predetermined inter-raster blanking period, and each set of raster lines being separated by a predetermined inter-set blanking period, the video image filtering apparatus comprising:

an image store for receiving and storing the input video signal;

means for reading the image store to generate a reformatted video signal having the predetermined sample rate but representing a sequence of sets of raster lines with a different inter-raster blanking period and a different inter-set blanking period, including an image counter for generating an image count value and an image address map store for mapping the image count value to an address value within the image store holding the next data value to be added to the reformatted video signal;

means for extending the active video data of the raster lines of the reformatted video signal; and at least one multi-tap filter for filtering the reformatted video signal with extended active video data.

9. A video image filtering apparatus as claimed in claim 8, wherein the image store holds only active video data from the input video signal and the means for reading the image store includes a blanking value generator responsive to the address values for inserting blanking data into the reformatted video data at times corresponding to the inter-raster blanking period and the inter-set blanking period.

10. A video image filtering apparatus comprising:
a line store for receiving and storing data representing a raster line of an input video signal;

means for repeatedly reading the line store in an order that generates an extended raster line formed of the data of the raster line of the input video signal extended with at least one repeated portion of the data of the raster line of the input video signal; and a multi-tap filter for filtering the extended raster line.

11. A video image filtering apparatus as claimed in claim 10 comprising two line stores with corresponding means for reading connected to form a swing buffer arrangement, each line store receiving and extending alternate raster lines of the input video signal and passing the extended raster lines to the multi-tap filter.

12. A video image filtering apparatus comprising:
a line store for receiving and storing data representing a raster line of an input video signal;

means for reading the line store in an order that Generates an extended raster line formed of the data of the raster line of the input video signal extended with data derived from the raster line of the input video signal, including a line counter for generating a line count value and a line address map store for mapping the line count value to an address value within the line store holding the next data value to be added to the extended raster line; and a multi-tap filter for filtering the extended raster line.

13. A video image filtering apparatus comprising:
a line store for receiving and storing data representing a raster line of an input video signal;

means for reading the line store in an order that generates an extended raster line formed of the data of the raster line of the input video signal extended with a mirror symmetric copy of part of the raster line of the input video signal added to each end of the raster line of the input video signal; and a multi-tap filter for filtering the extended raster line.

14. A video image filtering method for filtering an input video signal, the input video signal having a predetermined sample rate and representing a sequence of sets of raster lines, each raster line having a period of active video data and a predetermined inter-raster blanking period, and each set of raster lines being separated by a predetermined inter-set blanking period, the video image filtering method comprising the steps of:

(i) receiving and storing the input video signal into an image store;

(ii) reading the image store to generate a reformatted video signal having the predetermined sample rate but representing a sequence of sets of raster lines with a different inter-raster blanking period and a different inter-set blanking period;

(iii) extending the active video data of the raster lines of the reformatted video signal; and (iv) filtering the reformatted video signal with extended active video data using one or more multi-tap filters.

15. A video image filtering method comprising the steps of:

receiving and storing data representing a raster line of an input video signal in a line store;

repeatedly reading the line store in an order that generates an extended raster line formed of the data of the raster line of the input video signal extended with at least one repeated portion of the data of the raster line of the input video signal; and filtering the extended raster line with a multi-tap filter.

* * * * *